(12) United States Patent
Peupelmann et al.

(10) Patent No.: US 6,816,260 B2
(45) Date of Patent: Nov. 9, 2004

(54) FIBER POLARIMETER, THE USE THEREOF, AS WELL AS POLARIMETRIC METHOD

(75) Inventors: Jens Peupelmann, Krummenhennersdorf (DE); Egbert Krause, Burgstaedt (DE); Adalbert Bandemer, Dachau (DE)

(73) Assignee: Thorlabs GmbH, Karlsfeld (DE)

( * ) Notice: Subject to any disclaimer, the term of this patent is extended or adjusted under 35 U.S.C. 154(b) by 0 days.

(21) Appl. No.: 10/147,143

(22) Filed: May 15, 2002

(65) Prior Publication Data

US 2003/0002041 A1 Jan. 2, 2003

(30) Foreign Application Priority Data

May 17, 2001 (DE) .......................................... 101 24 291
Mar. 6, 2002 (DE) .......................................... 102 09 826

(51) Int. Cl.[7] .............................. G01J 4/00; G02B 6/00; G02B 6/26; G02B 6/34
(52) U.S. Cl. ........................ 356/364; 356/365; 356/366; 356/367; 356/369; 356/370; 385/11; 385/12; 385/18; 385/37
(58) Field of Search ................................ 356/364–367, 356/369, 370; 385/10–12, 18, 37

(56) References Cited

U.S. PATENT DOCUMENTS

| | | | |
|---|---|---|---|
| 4,832,492 A | * | 5/1989 | Calvani et al. |
| 5,394,488 A | * | 2/1995 | Fernald et al. |
| 5,550,654 A | * | 8/1996 | Erdogan et al. |
| 5,815,270 A |   | 9/1998 | Lee |
| 6,044,093 A | * | 3/2000 | Ventrudo et al. |
| 6,211,957 B1 | * | 4/2001 | Erdogan et al. ............ 356/364 |
| 6,233,373 B1 | * | 5/2001 | Askins et al. |
| 6,298,184 B1 | * | 10/2001 | Putnam et al. |
| 6,380,553 B2 | * | 4/2002 | Jopson et al. |
| 6,400,869 B2 | * | 6/2002 | Pan et al. |
| 2001/0038729 A1 | * | 11/2001 | Westbrook .................... 385/11 |

OTHER PUBLICATIONS

Bouzid, A. et al., "Fiber–optic four–detector polarimeter," Optics Communications, 118, pp. 329–334, 1995.
Erdogan, T. et al., "Tilted fiber phase gratings," J. Opt. Soc. Am. A, vol. 13, No. 2, pp. 296–313, Feb. 1996.
T. Pikaar et al.: Fast complete polarimeter for optical fibres; E–FOC 1989.
R. M. A. Azzam: Inline light saving photopolarimeter and its fiber optic analog; Optic Letters, vol. 12, No. 8, pp. 558–560, 1987.
M.A. Habli: Experimental implementation of a fiber optic four detector photopolarimeter; Optik, vol. 110, No. 9, pp. 433–435, 1999.
T. Erdogan et al.: Characterization of UV–induced birefringenece in photo–sensitive Ge–doped silica optical fibers; J. Opt. Soc. Am. B/vol. 11, No. 10, pp. 2100–2105, 1994.
R. Ulrich et al.: Bending–induced birefringence in single–mode fibers; Optics Letters, vol. 5, No. 6, Jun. 1980.
R.M.A. Azzam et al.: General analysis and optimization of the four–detector photopolarimeter, J. Opt. Soc. Am., vol. 5, No. 5, May 1988.

* cited by examiner

Primary Examiner—Frank G. Font
Assistant Examiner—Khaled Brown
(74) Attorney, Agent, or Firm—Finnegan, Henderson, Farabow, Garrett and Dunner LLP (57) ABSTRACT

A fiber polarimeter has one or more oblique fiber Bragg gratings disposed one behind the other in a fiber. The fiber Bragg gratings couple out portions of a light wave input to the fiber depending on its polarization. For more than one fiber Bragg grating a wave plate is disposed in the fiber between consecutive fiber Bragg gratings. The portions of the light wave from the fiber Bragg grating(s) are detected to produce measurement data that is used to calculate four Stokes parameters for determining polarization, degree of polarization and/or power of the light wave.

2 Claims, 7 Drawing Sheets

FIBER POLARIMETER, THE USE THEREOF, AS WELL AS POLARIMETRIC METHOD

BACKGROUND OF THE INVENTION

The present invention relates to a polarimeter in an all-fiber configuration, and more particularly to an assembly for determining the polarization, the degree of polarization and the power of light guided in a glass fiber, the use thereof, as well as a polarimetric method.

Light is an electromagnetic wave, the electric field strength components of which are oscillating with the optical angular frequency $\Omega$ in the x-y plane orthogonal to the propagation direction z. Each wave may be separated into 2 orthogonal partial waves, the amplitudes and phase relationships of which uniquely describe the polarization.

In the case of linear partial waves:

$$E(t)=[E_x \cos(\Omega t+\phi_x)E_y \cos(\Omega t+\phi_y)][e_x, e_y]$$

A polarization variation is caused by a variation in the phase difference $\Delta\phi=\phi_y-\phi_x$ or by a variation in the ratio of amplitudes.

For describing the polarization, several equivalent parameters are usual. Aside from the parameters of the polarization ellipse, azimuth $\theta$ and ellipticity angle $\epsilon$, the normalized Stokes parameters $s_1$, $s_2$, $s_3$ are widespread. A complete description of even only partially polarized light waves gives the Stokes parameters $S_0$, $S_1$, $S_2$ and $S_3$. From these the normalized Stokes parameters $s_1$, $s_2$, $s_3$ are derivable for describing the polarization state, the degree of polarization and the total power.

The refractive index n of a wave plate is direction-dependent. Therefore, the generally linear partial waves experience different phase velocities and obtain a phase difference.

A polarizer attenuates the partial wave in its blocking direction considerably more than the orthogonal component in its transmission direction. Therefore, the transmitted power becomes polarization-dependent and a simple detection of the polarization is realized.

The use of a polarimeter and a polarimetric method, respectively, has the following application fields:

Determining the degree of polarization (DOP)
Determining the degree of polarization (DOP) as a control signal in a polarization mode dispersion (PMD) compensator
Determining the polarization-dependent attenuation and loss (PDL), respectively, of optical fibers and components
Determining the polarization mode dispersion (PMD) of optical fibers and components
Analysis of birefringent and polarizing materials
Determining the extinction ratio (ER) in polarization maintaining fibers
Evaluation of sensors on a polarimetric basis (e.g. Faraday current sensor)
Extraction of control signals in automatic polarization controllers and many other things.

Aside from "complete polarimeters", which detect all of the four Stokes parameters, there are means that determine only the deviation of the polarization state from a desired polarization state. This may be realized by simple polarizers, polarization beam splitters, etc.

The polarization of the light may be described mathematically by means of the Stokes vector. The Stokes vector is completely determined by the four Stokes parameters $S_0 \ldots S_3$. The Stokes parameters are defined as follows: $S_0$(absolute power), $S_1$ (linearly horizontally polarized component less the linearly vertically polarized component), $S_2$ (linearly 45° polarized component less the linearly −45° polarized component), $S_3$ (right-handed circularly polarized component less the left-handed circularly polarized component).

For determining the polarization state, the degree of polarization and the power of the light, all four parameters of the Stokes vector have to be determined.

A polarimeter in the form of an assembly having a rotating wave plate in combination with a polarizer fixedly arranged in front of a detector is known. From the detected signal, the four Stokes parameters may be determined. However, the mechanically moving parts limit the measurement result speed.

There are also known various polarimeter assemblies, using beam splitters, polarization beam splitters, polarizers and wave plates, which separate the incident light beam such that the four Stokes parameters may be determined with at least four correspondingly disposed detectors. However, these assemblies normally require a high adjustment effort, see T. Pikaar et al.: Fast complete polarimeter for optical fibres; E-FOC 1989.

Another disadvantage of the assemblies mentioned above is the fact that with these assemblies an inline measurement, namely a determination of the polarization characteristics of the light guided in the glass fiber, usually is not possible. So-called fiber polarimeters or inline polarimeters avoid this disadvantage.

There are known various embodiments of fiber polarimeters. In the patent specification (U.S. Pat. No. 5,815,270) an assembly having a 1×5 fusion coupler as well as succeeding polarizers and wave plates is disclosed.

Another known assembly is presented in R. M. A. Azzam: Inline light saving photopolarimeter and its fiber optic analog; Optic Letters, Vol. 12, No. 8, pp. 558–560, 1987 where polarization-dependent couplers are used for determining the Stokes parameters.

Another known assembly is presented in M. A. Habli: Experimental implementation of a fiber optic four detector photopolarimeter; Optik, Vol. 110, No. 9, pp. 433–435, 1999. There partially ground fibers are used to couple a polarization-dependent portion of the light out of the fiber.

The patent specification (U.S. Pat. No. 6,211,957B1) discloses another assembly of a fiber polarimeter. According to this, oblique fiber Bragg gratings are used, where the grating period and the angle between grating plane and fiber axis are selected such that light can couple from the guided fundamental mode into a radiation mode. This coupling is highly polarization-dependent. For determining the four Stokes parameters four differently oriented gratings are used where, in addition to the discrimination between right-handed circularly and left-handed circularly polarized light, a UV-induced wave plate is interposed. UV-induced birefringence is described in T. Erdogan et al.: Characterization of UV-induced birefringence in photo-sensitive Ge-doped silica optical fibers; J. Opt. Soc. Am. B/Vol. 11, No. 10, pp. 2100–2105, 1994. The generation of birefringence by bending the glass fiber is described in R. Ulrich et al.: Bending-induced birefringence in single-mode fibers; Optics Letters, Vol. 5, No. 6, June 1980.

This solution is disadvantageous in that the fiber Bragg gratings have to be inscribed with four different orientations to the fiber axis (0°, 90° and 45°, 135°). In manufacturing the fiber Bragg gratings, this may be achieved by an appropriate rotation of the glass fiber about the fiber axis, but is associated with considerable effort. This also implies that the individual fiber Bragg gratings couple out light in four different directions. Thus, the use of planar detector rows or detector arrays is not possible.

Another disadvantage is the asymmetry of the coupled-out polarization components. With respect to the input, the polarization states linear 0°, linear 45° and linear 90° as well as a nearly circular polarization are coupled out. This assembly inevitably causes polarization-dependent losses (PDL) of the whole assembly, since the PDL of the individual gratings (components of the light intensity of a certain polarization direction are coupled out of the fiber) do not compensate for each other. Further, with three linear polarization states and an approximately circular polarization state, in the analysis of any polarization state the optimum cannot be achieved when real detector currents are evaluated.

What is desired is a technologically simpler and cheaper fiber polarimeter having better quality characteristics, the use thereof, as well as a corresponding polarimetric method.

BRIEF SUMMARY OF THE INVENTION

According the present invention provides that fiber Bragg gratings are inscribed at a certain angle to a fiber axis such that at each grating two portions of the light, depending on the polarization, are coupled out of the fiber. This radiated light has two spatially separated intensity maximums occurring in different polarization states, which are detected or can be detected, respectively, by means of an appropriate number of detectors or preferably detector pairs. The manufacture of such fiber Bragg gratings is preferably performed by UV-induced refractive index modulation in the core of the glass fiber. In one embodiment, the interference pattern required for this is generated by means of an appropriate phase mask, wherein the phase mask is disposed at a certain angle to the fiber axis. Generally, a single-mode standard fiber is used. However, a glass fiber having a special refractive index and doping profile may be used to increase the coupling-out efficiency, to optimize the difference of the coupled-out polarization states, or to improve the extinction ratio (ER) of the polarization states thus being coupled out.

In one configuration of the assembly the fiber polarimeter has at least two special fiber Bragg gratings and an interposed wave plate. The fiber Bragg gratings may be differently oriented with respect to the fiber axis. In this assembly, preferably only two (instead of four) fiber Bragg gratings are required. The two powers coupled out by each grating, depending on the polarization, are each detected by one detector pair and converted to an electrical signal. For example, the two polarization states that a fiber Bragg grating couples out can be 0° linearly polarized and 90° linearly polarized. These signals are detected by appropriate hardware and further processed by software. From these data, by means of an algorithm and with regard to calibration data, the Stokes parameters are determined. Preferably photodiodes having an appropriate spectral sensitivity are used as detectors. The detectors, preferably detector pairs, are arranged such that their positions and sizes correspond to the position and size of the two spatially separated maximums of the coupled-out light. Since each fiber Bragg grating couples out two different polarization states and radiates in spatially different angles, the use of double photodiodes as the detectors is feasible.

In another embodiment of the assembly the detectors, or preferably the detector pairs, are disposed as close to the fiber as possible in order to achieve a signal intensity as high as possible. Another improvement of the signal intensity and the suppression of interfering Fabry-Perot effects may be achieved by avoiding the glass-air junction at the fiber surface and the beam spreading associated therewith because of the lens effect. The wave plates required in the assemblies may be produced by bending the glass fiber.

Further configurations are UV-induced birefringence, the use of a section of a birefringent glass fiber (polarization maintaining glass fiber), or the generation of birefringence by compressive loading the glass fiber. Generally, only a small portion of the light is coupled out by the fiber Bragg gratings, so that the insertion attenuation of the assembly is very low. But, since the coupled-out power is polarization-dependent, the assembly may have a low polarization-dependent loss (PDL). In individual gratings similarly tainted with PDL, the PDL is avoided by appropriate selection of the coupled-out polarization states and appropriate parameters for the wave plate. Of the totally four coupled-out polarization states, the polarization states coupled out by the same fiber Bragg grating respectively yield a polarization average value. If the average values of the coupled-out polarization states of the two fiber Bragg gratings are orthogonal to each other, then the polarization-dependent losses of the whole assembly compensate for each other and the whole assembly does not have a PDL.

Alternatively, a further fiber Bragg grating may be disposed succeeding each fiber Bragg grating of the assemblies, the parameters of which are identical, the orientation of which is orthogonal to the existing fiber Bragg grating, so that the polarization-dependent losses of one fiber Bragg grating are compensated for by a succeeding fiber Bragg grating.

In yet another embodiment of the assembly the gratings are inscribed in slightly birefringent (polarization maintaining) glass fiber. In this assembly the section of the fiber located between the gratings has the function of the wave plate.

Another embodiment results if the assembly is used for the generation of a control signal for the polarization-correct coupling into the principal axis of a polarization maintaining fiber. For this, the polarization maintaining fiber is disposed directly at the output, i.e. immediately after the last grating. In this variant, the orientation of the principal axes of the polarization maintaining fiber may be any with respect to the orientation of the gratings. Advantageously, the calibration of this assembly as a polarimeter is performed such that the polarization is measured with respect to the principal axes of the slightly birefringent (polarization maintaining) fiber.

In a further embodiment of the assembly for extraction of a control signal for the polarization-correct coupling into a polarization maintaining fiber, only one fiber Bragg grating is used, where the orientation of the two polarization states coupled out by the grating does not have to coincide exactly with one of the principal axes of the birefringent fiber. This fact allows for greater manufacturing tolerances in the angle adjustment between the principal axes of the polarization maintaining fiber and the coupled-out polarization states. From the two detector currents, a control signal may be generated, which provides a maximum output for the two coupled-out polarization states when coupling into the principal axis of the polarization maintaining fiber occurs. The achievable quality for the optimum coupling into the polarization maintaining fiber, expressed as the extinction ratio (ER), thereby may be substantially increased over conventional assemblies. For the operation of this assembly, it doesn't matter whether the fiber Bragg grating is disposed immediately in front of the polarization maintaining fiber or in the same.

The objects, advantages and other novel features of the present invention are apparent from the following detailed description when read in conjunction with the appended claims and attached drawing.

DETAILED DESCRIPTION OF THE INVENTION

Figure 1:
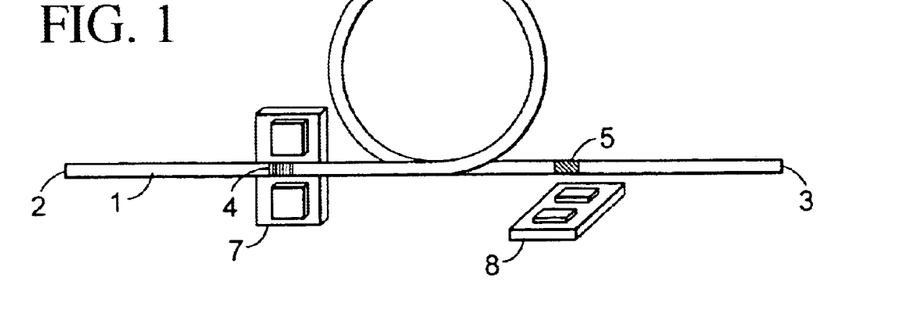
FIG. 1 is a simple diagrammatic view of a fiber polarimeter according to the present invention with the generation of a wave plate function being implemented by bending a fiber (fiber loop).

Referring now to FIG. 1, a fiber polarimeter for determining the polarization characteristics of light guided in a glass fiber includes a glass fiber 1 with an input 2 and an output 3. The core of the glass fiber 1 has two special fiber Bragg gratings 4, 5, the orientations of which are arranged 90° offset. Fiber Bragg gratings result by varying the structure of the core of light-guiding glass fibers. Here, grating structures, as zones of different refractive indices in the glass fiber core, are preferably generated photorefractively by means of a high performance UV laser. The illuminated portion of the fiber acts as a diffraction grating ("gratings").

Therefore, fiber Bragg gratings may serve as fiber-optic components reflecting light having a certain wavelength, while all the remaining wavelengths are transmitted. The reflection of the light is effected by the generated periodic refractive index structure within the light-guiding fiber. Between the fiber Bragg gratings 4, 5 a $\lambda/4$ wave plate 6 is disposed, which is produced in this embodiment by fiber bending, the one principal axis of which coincides with the orientation of the first fiber Bragg grating 4, and the second principal axis of which coincides with the orientation of the second fiber Bragg grating 5. Moreover, the assembly has two detector pairs 7, 8 serving to determine the signal components coupled out and radiated by the fiber Bragg gratings 4, 5. Furthermore, an adaptation of refractive index (not shown) may be provided between the fiber Bragg gratings 4, 5 and the detector pairs 7, 8.

In the operation of the fiber polarimeter the light coupled to the input 2 of the glass fiber 1 is guided in the core thereof to the first fiber Bragg grating 4. The fiber Bragg grating 4 has the property of coupling two small portions of the light intensity out of the glass fiber 1. This property is determined by the parameters of core refractive index of the glass fiber 1, UV-induced refractive index modulation as well as distance, angle and shape of the grating lines of the fiber Bragg grating 4. With appropriate selection of these parameters, the coupling-out efficiency and the intensity distribution of the radiated light depend on the polarization of the coupled-in light. A great portion of the light passes the fiber Bragg grating 4 and arrives at the wave plate 6. By means of the wave plate 6 a change in the state of polarization is effected. The light thus changed arrives at the second fiber Bragg grating 5. The function thereof is identical to the fiber Bragg grating 4, i.e. it has identical coupling-out efficiencies and intensity distributions. With respect to their individual orientations, the coupled-out polarization states do not differ. But, since the second fiber Bragg grating 5 is disposed perpendicularly to the orientation of the first grating 4, and by means of the wave plate 6 an additional polarization rotation occurs, the polarization states coupled out by the first fiber Bragg grating 4 differ from the polarization states coupled out by the second fiber Bragg grating 5 with respect to the fiber input 2.

By means of suitably dimensioned detector pairs 7, 8, adjusted according to the intensity maximums and fixedly connected to the glass fiber, the intensity of the coupled-out signal portions is determined. By an adaptation of refractive indices between glass fiber 1 and the detector pairs 7, 8, interfering Fabry-Perot effects are avoided. From the four detector signals of the two detector pairs 7, 8, by means of an appropriate algorithm and with regard to calibration data, the four Stokes parameters are determined which uniquely describe the polarization state, the degree of polarization and the power of the light guided in the glass fiber 1.

The accuracy of the fiber polarimeter achievable under real measurement conditions (e.g. in the presence of noise, drift, A/D error) greatly depends on the determinant of the instrument matrix. The instrument matrix M establishes the mathematically exact relation between the measured currents $I_0$ to $I_3$ and the Stokes parameters $S_0$ to $S_3$ to be determined.

$$[S_0, S_1, S_2, S_3] = [m_{00}, m_{01}, m_{02}, m_{03}; m_{10}, m_{11}, m_{12}, m_{13}; m_{20}, m_{21}, m_{22}, m_{23}; m_{30}, m_{31}, m_{32}, m_{33}] * [I_0, I_1, I_2, I_3]; S = M*I$$

The determinant of the instrument matrix M allows a statement about the stability of the calculated polarization values (polarization, DOP and power) with variation of the measured four detector currents. For stable measurement values a maximally high determinant is advantageous.

Figure 8:
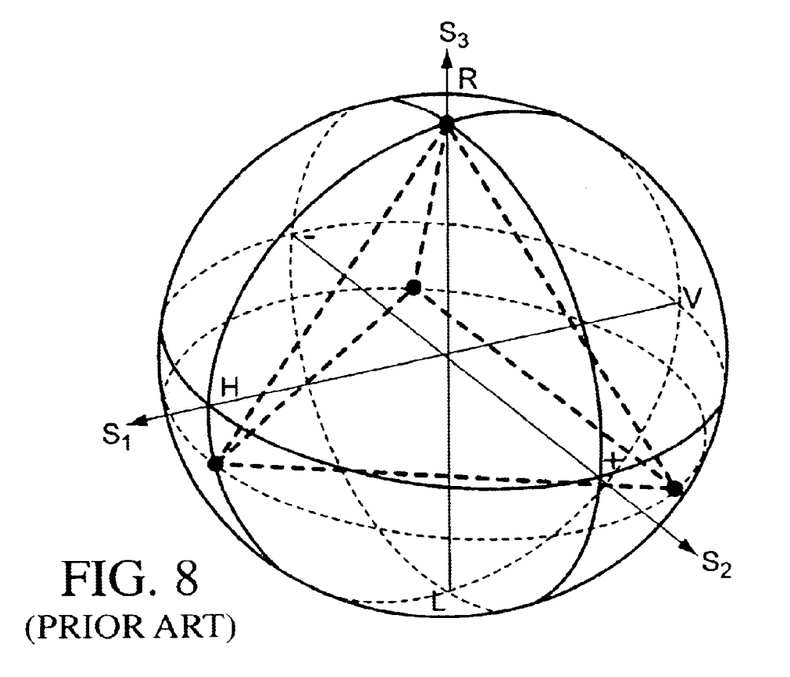
FIG. 8 is a diagrammatic view of an optimal distribution of the coupled-out polarization states on a Poincaré sphere according to the prior art.

In R. M. A. Azzam et al.: General analysis and optimization of the four-detector photopolarimeter, J. Opt. Soc. Am., Vol. 5, No. 5, May 1988 as optimum polarizations right-handed circular and three left-handed elliptical polarizations with the ellipticity angle −9.736° and the azimuthal angles 0°, 60° and −60° are mentioned. These four polarizations constitute the corner points of a pyramid having the greatest possible volume that can be inscribed within a Poincaré sphere, as shown in FIG. 8. This characteristic implies at the same time the maximum determinant of the instrument matrix of the polarimeter and the greatest possible stability of the measurement values.

Figure 9:
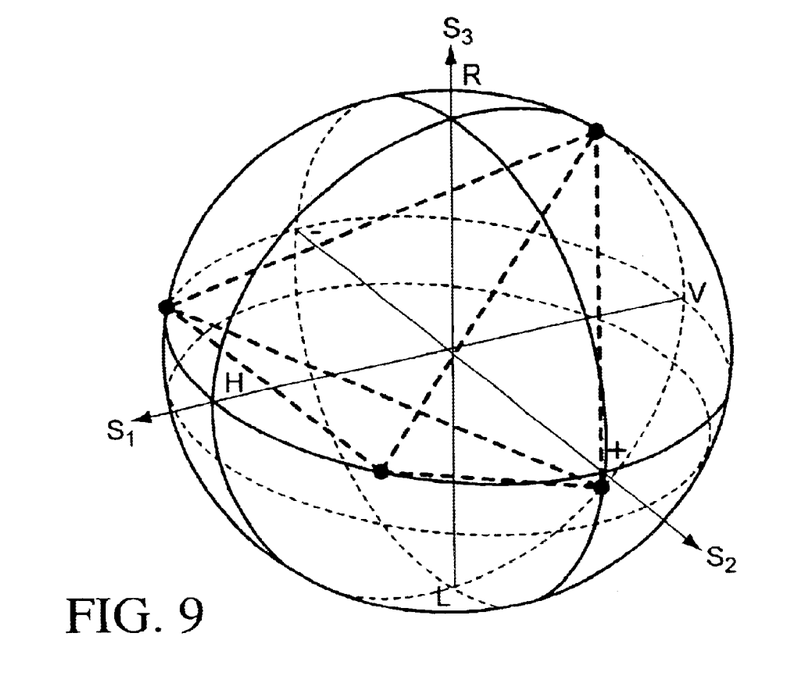
FIG. 9 is a diagrammatic view of an optimum distribution of the coupled-out polarization states on a Poincaré sphere according to the present invention.

The fiber polarimeter of FIG. 1, with the appropriate selection of the grating and wave plate parameters, may achieve this theoretical maximum. The optimal wave plate has a delay of $\lambda/4=90°$. The optimal fiber Bragg gratings each couple out two linear polarizations, which have a physical orientation of ±27.3675° to the principal axes of the wave plate (0°/90°). With respect to the input, two linear polarizations with ±(2*27.3675°) azimuthal angle, and two elliptical polarizations with the ellipticity angles ±(2*27.3675°) and an azimuth of 90° result, as shown in FIG. 9.

In this configuration, the volume of the resulting pyramid, the determinant of the instrument matrix M and the stability of the measurement values are identical to those of Azzam et al., since in both configurations all of the four polarizations are separated from each other by a spatial angle of 109.47°. Due to the low polarization-dependent coupling-out of light by the fiber Bragg gratings, the polarization-dependent loss (PDL) is low. For example, the absence of PDL in the fiber polarimeter of FIG. 1 is achieved if the first fiber Bragg grating 4 couples out two linear polarization states disposed symmetrically to the horizontal axis, and the second fiber Bragg grating 5 couples out two elliptical polarization states disposed symmetrically to the vertical axis with respect to the input.

Figure 2A:
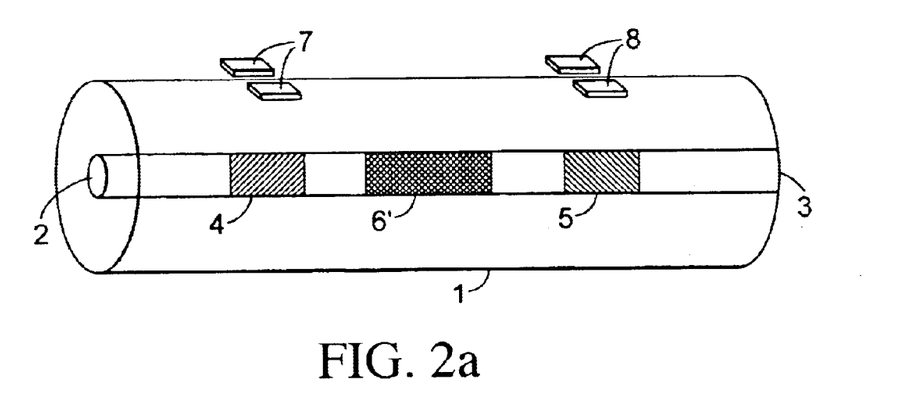
FIGS. 2a and 2b are diagrammatic views of further embodiments of a fiber polarimeter according to the present invention with a UV-induced wave plate.
Figure 2B:
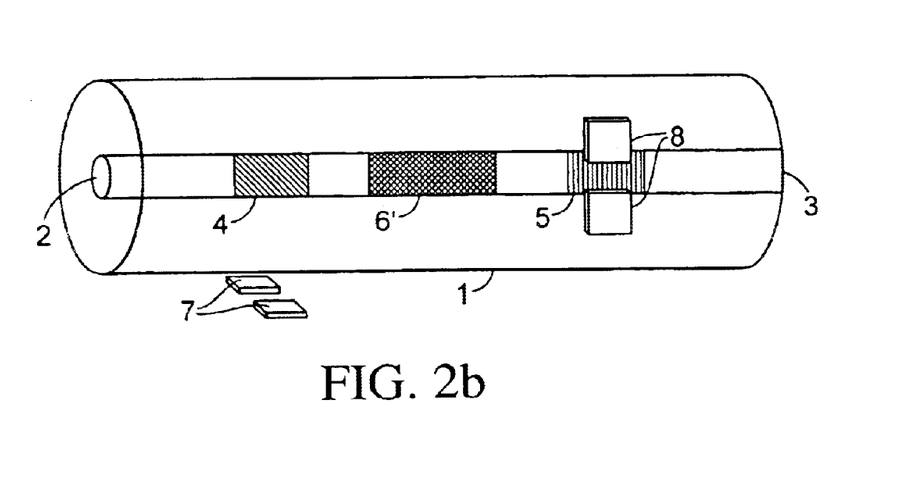

FIGS. 2a and b show another preferred embodiment of the fiber polarimeter which differs from FIG. 1 only in that the wave plate 6 is configured as an UV-induced wave plate 6'. In FIG. 2a, the principal axes of the wave plate 6' are oriented such that they coincide with the average value of the two polarization states coupled out by the first fiber Bragg grating 4 and with the average value of the two polarization states coupled out by the second fiber Bragg grating 5. In FIG. 2b the orientation of the principal axes are horizontal and vertical. In FIG. 2b, the fiber polarimeter with mutually orthogonal coupling-out directions of the two fiber Bragg gratings is illustrated, while FIG. 2a illustrates another, but not optimal configuration.

Figure 3:
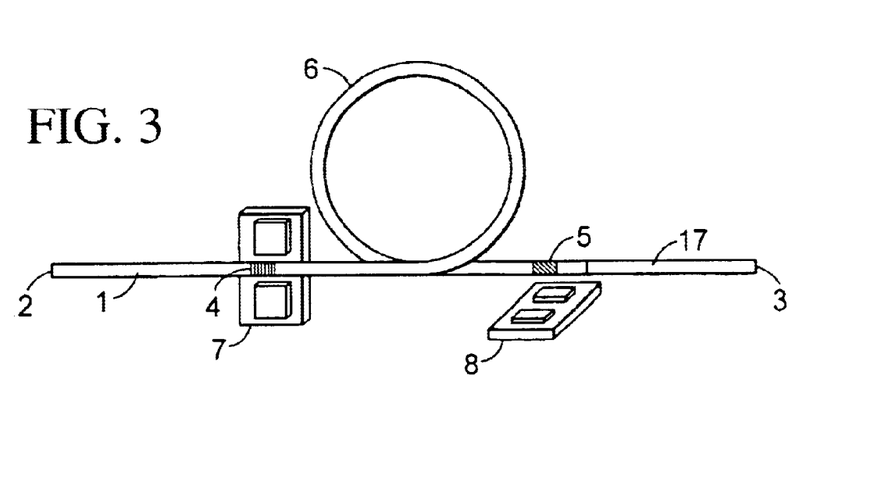
FIG. 3 is a diagrammatic view of yet another embodiment of a fiber polarimeter according to the present invention with a polarization maintaining fiber (PMF) as an output fiber.

FIG. 3 shows another preferred embodiment of the fiber polarimeter where the output fiber 17 is configured as a polarization maintaining fiber. In this case, the fiber polarimeter may be used for extracting control signals for the polarization-correct coupling into the principal axis of the polarization maintaining fiber 17. Therefore the variation of the polarization state may be effected by a polarization controller, preceding the fiber polarimeter and driven by the control signal. Since the measurement of the polarization is effected immediately in front of the polarization maintaining fiber 17, no polarization conversions, e.g. by single-mode connecting fibers, interfere with the achieved optimum coupling into the polarization maintaining fiber.

Figure 4A:
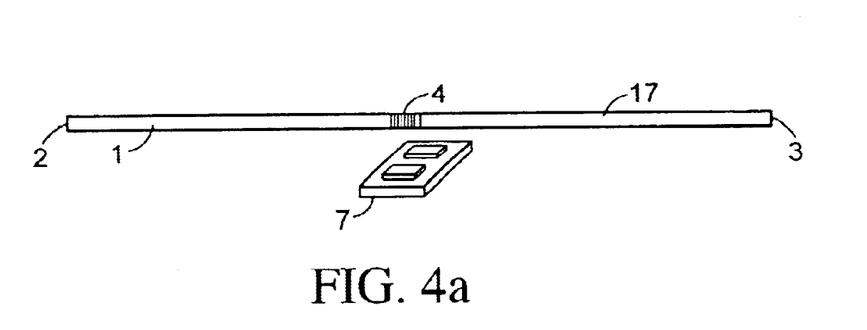
FIG. 4a is a diagrammatic view of still another embodiment of a fiber polarimeter according to the present invention with a special grating in a standard fiber and a PMF as an output fiber.
Figure 4B:
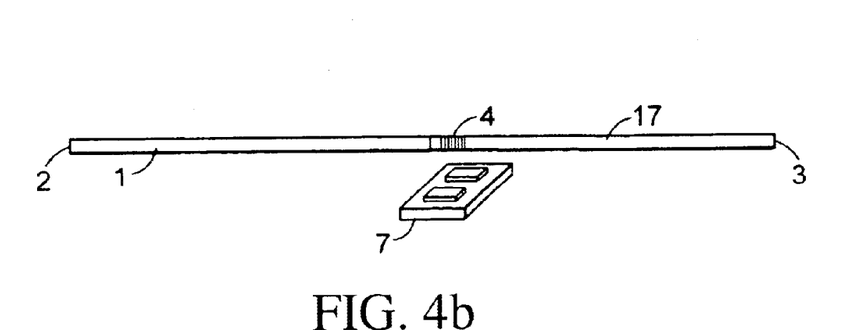
FIG. 4b is a diagrammatic view of a further embodiment of fiber polarimeter according to the present invention with a special grating in a polarization maintaining fiber (PMF) and the PMF as an output fiber.

Referring to FIGS. 4a and 4b, the assembly for extracting control signals for the polarization-correct coupling into the principal axis of a polarization maintaining fiber 17 has a glass fiber 1 with an input 2 and a polarization maintaining glass fiber 17 with an output 3. Further, the assembly has a fiber Bragg grating 4 that is disposed either, as shown in FIG. 4a, immediately in front of or, as shown in FIG. 4b, in the polarization maintaining glass fiber 17. There the orientation of one of the two coupled-out polarization states of the fiber Bragg grating 4 coincides with the orientation of a principal axis of the polarization maintaining glass fiber 17. Also the coincidence of the average value of the two coupled-out polarization states of the fiber Bragg grating 4 with the principal axis of the polarization maintaining glass fiber 17 is desirable. Further, the assembly has a detector pair 7 for determining the signal portions coupled out and radiated by the fiber Bragg grating 4. From the two detector signals, an exact control signal for a polarization controller, which for example precedes the assembly, is extracted. The signal detection with two photodiodes is helpful for the control of the polarization, since the direction of the polarization deviation may be determined more fully, and thus a quick and aimed polarization control is attained. By electronic or mathematical weighting of the detector signals, the weighted control signal may be maximum when the polarization state exactly coincides with the principal axis of the polarization maintaining fiber 17.

Figure 5:
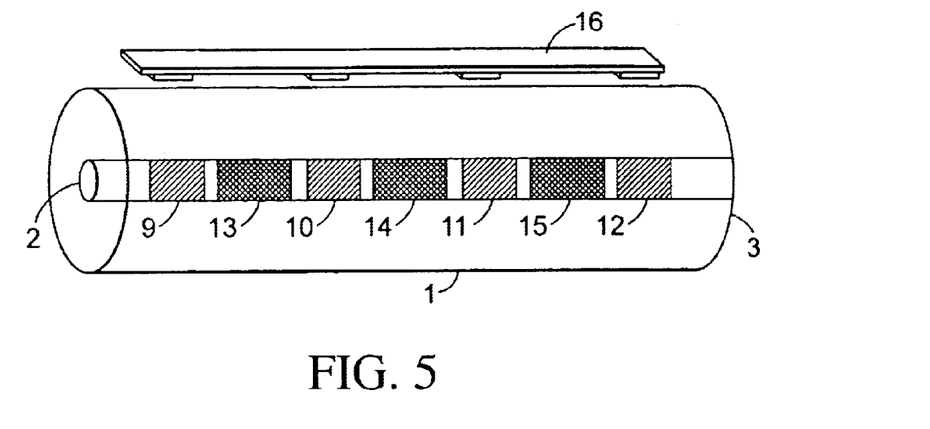
FIG. 5 is a diagrammatic view of a fiber polarimeter according to the present invention with a detector array.

FIG. 5 shows another supplement to the prior art. According to this, fiber Bragg gratings 9, 10, 11, 12 are used where the light coupled out and radiated by these gratings here has respectively only one intensity maximum and is detected by means of a detector row 16. However, the substantial difference to the disclosed prior art is that all of the fiber Bragg gratings 9–12 are inscribed with the same orientation to the fiber axis. Between each two adjacent fiber Bragg gratings 9 and 10, 10 and 11, 11 and 12, wave plates 13, 14, 15 having a certain delay and orientation are disposed. As shown in FIG. 5 at least four oblique fiber Bragg gratings are disposed, one behind the other, and with the same orientation to the fiber axis, where the coupled-out and radiated light of each grating has only one intensity maximum. The corresponding detectors are all arranged on one side of the glass fiber. This allows the use of detector rows or arrays, presenting a substantial advantage. Between two adjacent fiber Bragg gratings a wave plate with a certain orientation and delay respectively is disposed such that, despite the same orientation of the fiber Bragg gratings, the determination of the four Stokes parameters from the four detector signals becomes possible. For example, the four fiber Bragg gratings may be disposed with the orientation 0°, separated by 3 $\lambda/4$ wave plates with the orientation 45°, 0° and again 0°. Since all of the fiber Bragg gratings radiate into the same direction, the advantageous use of two or four quadrant photodiodes or of planar detector rows or arrays, respectively, is feasible.

Figure 6:
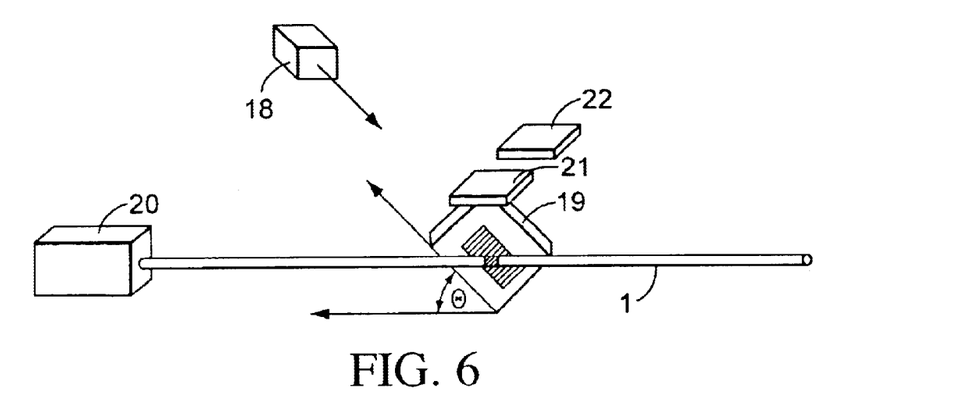
FIG. 6 is a diagrammatic view of an assembly for manufacturing the special fiber Bragg gratings according to the present invention.

In inscribing fiber Bragg gratings into optical fibers the fact that, by influence of powerful UV radiation (excimer laser: KrF, ArF) on quartz glass doped with germanium the refractive index of the fiber core permanently increases, is used. This inscribing process may be effected either by interferometric superposition of two partial beams of a separated laser beam, by transverse laser illumination of a prefabricated phase mask or by punctual controlled laser illumination of the optical fiber. In each case, a remaining periodic structural variation of the refractive index in the fiber core is generated. This plurality of reflection sites corresponds to an optical grating and has either equidistant or varying distances. In FIG. 6, a preferred assembly for producing the special fiber Bragg gratings is shown in diagrammatic form. It has a UV laser 18, a phase mask 19 and the glass fiber 1. Further, means for positioning the fiber 1 and phase mask 19, a depolarized light source 20, as well as large area detectors 21, 22 are provided. By UV illumination of the glass fiber 1 the required oblique fiber Bragg gratings are produced. The light coupled-out by the fiber Bragg gratings has two spatially separated intensity maximums occurring in different polarizations. This spatial distribution results with appropriate selection of grating constant and angle Θ as well as exact adjustment of the inscribing beam. The coupled-out power may be observed by means of suitably positioned detectors 21, 22 and optionally may be corrected by variation of the adjustment between inscribing beam, phase mask and fiber during the manufacture. By the use of a cylindrical lens for beam focusing, the manufacturing process may be substantially accelerated.

Figure 7:
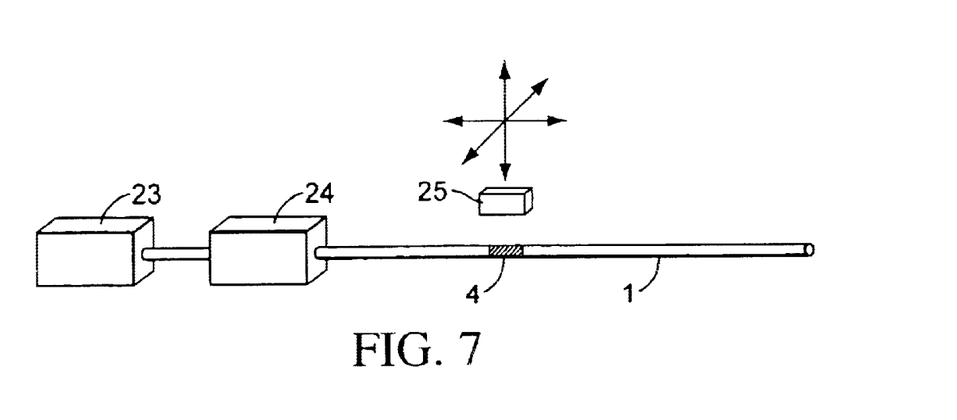
FIG. 7 is a diagrammatic view of an assembly for determining the radiation characteristic according to the present invention.

FIG. 7 shows an assembly for determining the radiation characteristic of the fiber Bragg gratings. It consists of a polarized light source 23, a polarization controller 24, the fiber Bragg grating 4 to be examined, and a detector 25, positionable by appropriate means, having a small detection area for sensing the spatial intensity distribution. By varying the detector position, the radiation characteristic may be determined. By varying the polarization state by means of the polarization controller 24, the variation of the radiation characteristic may be observed. If a depolarized light source 20, such as an ASE source, is used, the polarization controller 24 may be omitted.

FIG. 8 shows the optimum distribution of the four coupled-out polarizations (with respect to the fiber input) according to R. M. A. Azzam et al.: General analysis and optimization of the four-detector photopolarimeter, J. Opt. Soc. Am., Vol. 5, No. 5, May 1988. The polarizations right-handed circular and three left-handed elliptical polarizations with the ellipticity angle of −9.736° and the azimuthal angles 0°, 60° and −60° constitute the corner points of the pyramid with the greatest possible volume that can be inscribed within the Poincaré sphere.

FIG. 9 shows an identical, but spatially rotated, pyramid within the Poincaré sphere for the fiber polarimeter of FIG. 1. The corner points are formed by two linear polarizations with an azimuthal angle of ±(2*27.3675°) and two elliptical polarizations with the ellipticity angles of ±(2*27.3675°) and an azimuth of 90°.

Figure 10A:
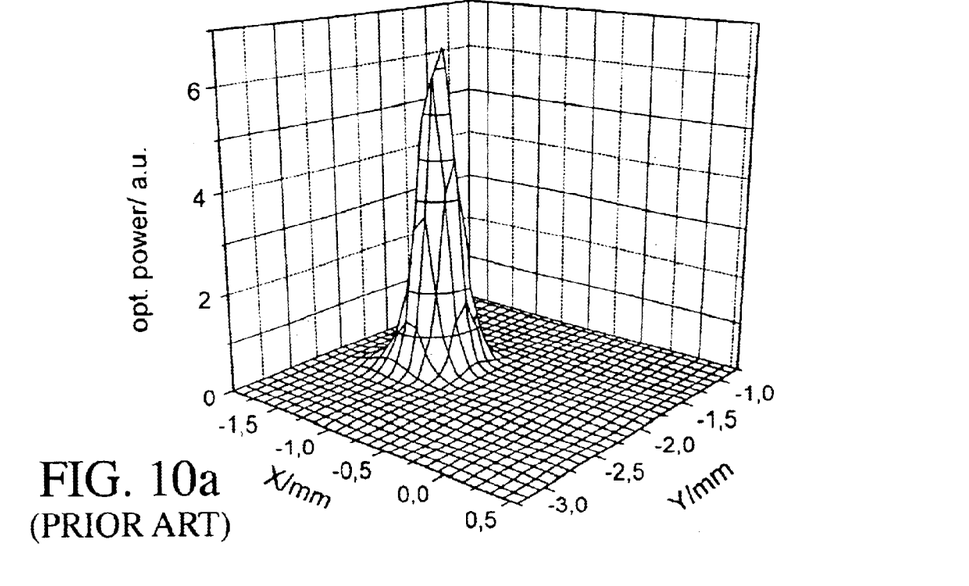
FIGS. 10a and 10b are illustrative graphic views of the measured intensity distribution of the coupled-out light of an oblique grating according to the prior art.
Figure 10B:
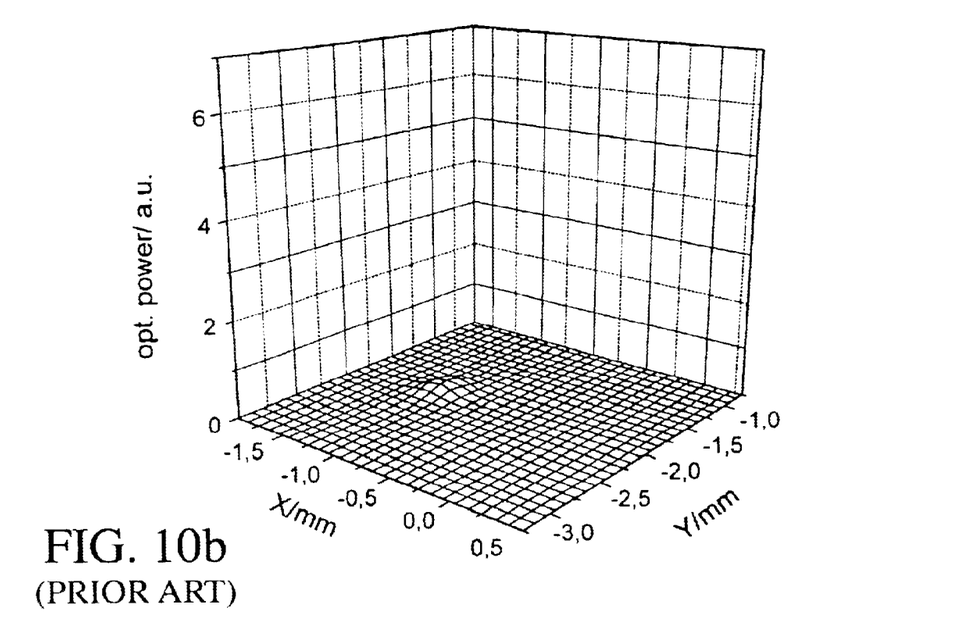

FIGS. 10 to 12 show example recorded radiation characteristics: FIGS. 10*a* and 10*b* show the radiation characteristics of an oblique fiber Bragg grating according to the known prior art using a polarized light source. In FIG. 10*a*, the polarization of the light has been adjusted for achieving maximum coupling-out, and in FIG. 10*b* for achieving minimum coupling-out.

Figure 11A:
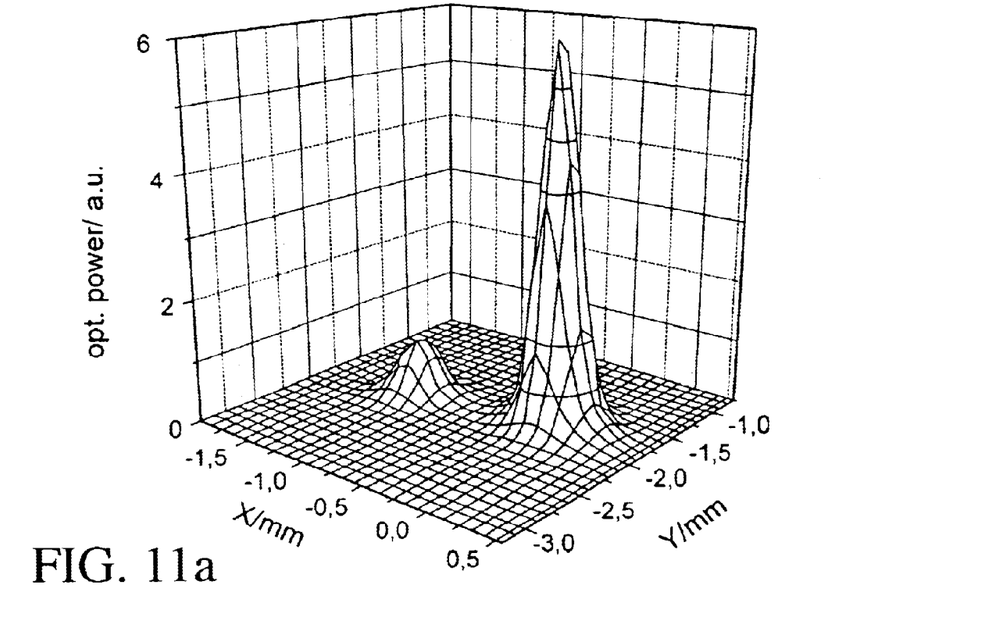
FIGS. 11a and 11b are illustrative graphic views of the measured intensity distribution of the coupled-out light of an oblique grating according to the present invention with a polarized light source.
Figure 11B:
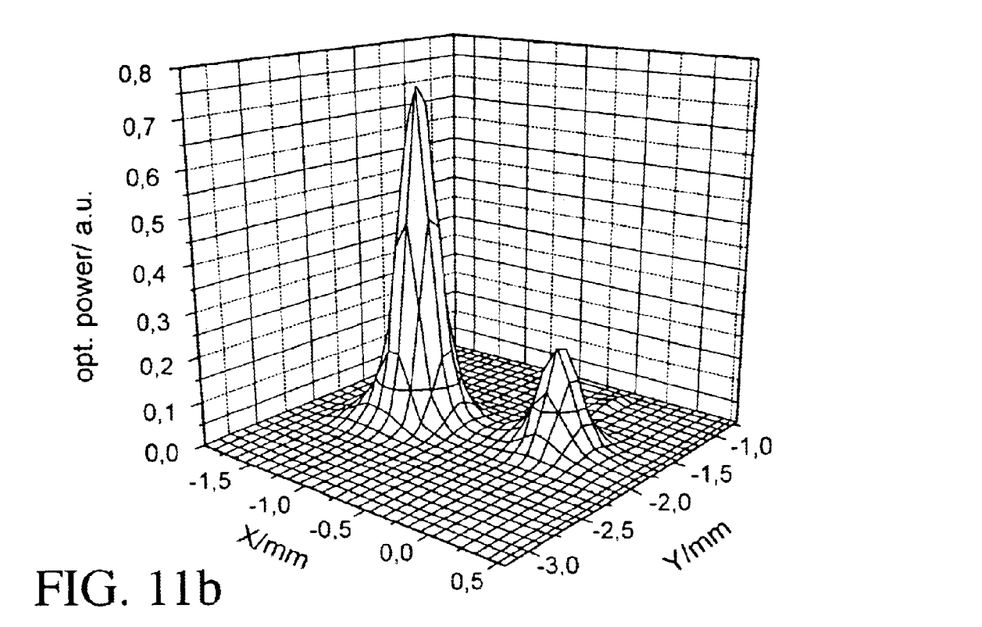

FIGS. 11*a* and 11*b* show examples of the radiation characteristics of a special fiber Bragg grating according to the present invention. For characterization, analogous to FIGS. 10*a* and 10*b*, the input polarization has been varied and the respective radiation characteristics in FIGS. 11*a* and 11*b* have been recorded. In contrast to FIGS. 10*a* and 10*b*, the radiation characteristics of the special fiber Bragg grating has two spatially separated intensity maximums occurring in different polarizations.

Figure 12:
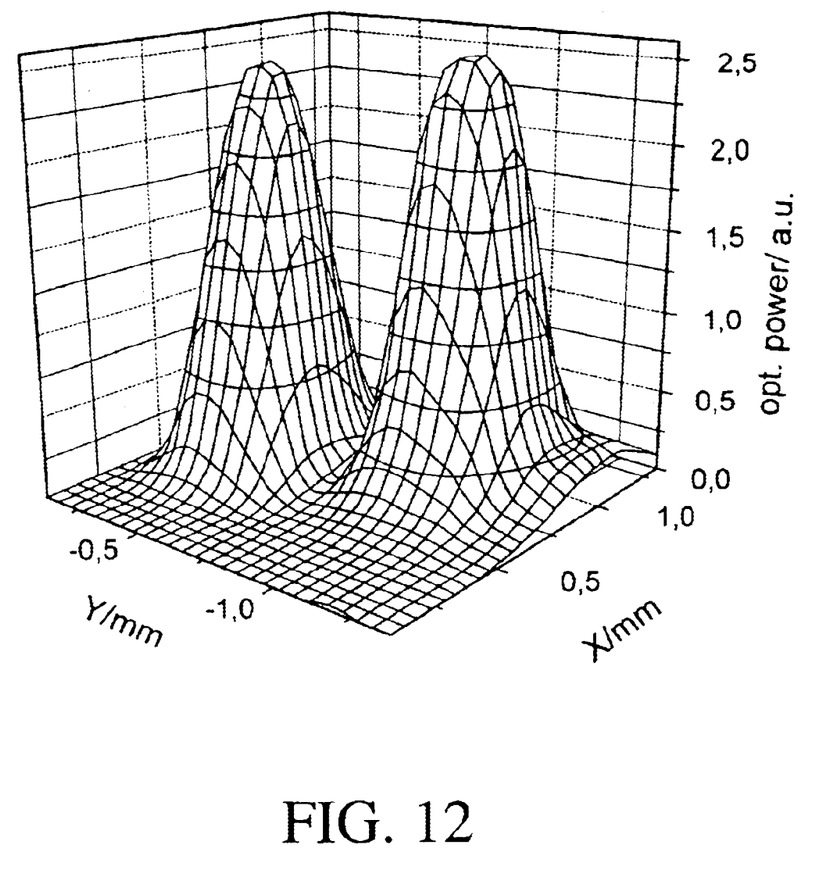
FIG. 12 is an illustrative graphic view of the measured intensity distribution of the coupled-out light of an oblique grating according to the present invention with an unpolarized light source.

FIG. 12 shows an example of the radiation characteristics of the special fiber Bragg grating according to the present invention. For characterization, in contrast to FIGS. 11*a* and 11*b*, a depolarized light source has been used. In this case both intensity maximums may be shown simultaneously.

Thus the present invention provides a fiber polarimeter, the use thereof, as well as methods for determining the polarization, the degree of polarization and/or the power of the light guided in a glass fiber, with one or more oblique fiber Bragg gratings, disposed one behind the other, where the fiber Bragg gratings couple out depending on the polarization.

What is claimed is:

1. A polarimetric method comprising the steps of:

coupling a light wave into a fiber having a fiber Bragg grating inscribed in the fiber at a special angle to an axis of the fiber wherein the fiber Bragg grating comprises at least two fiber Bragg gratings inscribed in the fiber and a wave plate disposed in the fiber between the at least two fiber Bragg gratings;

coupling at least two portions of the light wave, depending upon the polarization of the light wave, out of the fiber at the fiber Bragg grating, the two portions being spatially separated with intensity maximums occurring at different polarization states; and detecting each portion coupled out of the fiber at the fiber Bragg grating to provide measurement data, the detecting step comprising the step of coupling a plurality of detectors to the fiber according to the intensity maximums from each fiber Bragg grating, the plurality of detectors grouped in pairs for each fiber Bragg grating.

2. A fiber polarimeter comprising:

an optical fiber, the fiber including an input end for receiving an optical signal, an output end, and an optical axis;

a first fiber Bragg grating formed in the optical fiber, the first fiber Bragg grating formed such that light is reflected from the first fiber Bragg grating in two intensity maxima, each of the two intensity maxima corresponding to a different polarization of the optical signal;

a second fiber Bragg grating formed in the optical fiber between the first fiber Bragg grating formed such that light is reflected from the second fiber Bragg grating in two intensity maxima, each of the two intensity maxima corresponding to different polarizations of an incident optical signal;

a wave plate disposed in the optical fiber between the first fiber Bragg grating and the second fiber Bragg grating to receive the optical signal and provide the incident optical signal;

a first detector coupled to receive the two intensity maxima from the first Bragg grating; and a second detector coupled to receive the two intensity maxima from the second Bragg grating, wherein the first detector provides signals related to the two intensity maxima from the first Bragg grating and the second detector provides signals related to the two intensity maxima from the second Bragg grating.

* * * * *

UNITED STATES PATENT AND TRADEMARK OFFICE
CERTIFICATE OF CORRECTION

PATENT NO. : 6,816,260 B2
DATED : November 9, 2004
INVENTOR(S) : Peupelmann et al.

It is certified that error appears in the above-identified patent and that said Letters Patent is hereby corrected as shown below:

Column 10,
Line 43, replace the paragraph starting with words " a second fiber Bragg grating... " with the following paragraph:
-- a second fiber Bragg grating formed in the optical fiber, the second fiber Bragg grating formed such that light is reflected from the second fiber Bragg grating in two intensity maxima, each of the two intensity maxima corresponding to different polarizations of an incident optical signal; --
Line 62, add the following paragraphs:
-- 4. The fiber polarimeter of claim 2, further including a signal processor coupled to receive the signals from the first detector and the signals from the second detector and calculate Stokes parameters.
5. The fiber polarimeter of claim 2, wherein the first detector includes a detector pair positioned to receive the two intensity maxima from the first Bragg grating, and the second detector includes a detector pair positioned to receive the two intensity maxima from the second Bragg grating. --

Signed and Sealed this

Eighth Day of February, 2005

JON W. DUDAS
*Director of the United States Patent and Trademark Office*